April 14, 1931.  F. T. McDONOUGH  1,800,651
DYNAMIC BALANCING MACHINE AND RECORDING AMPLIMETER THEREFOR
Filed Aug. 14, 1926  4 Sheets-Sheet 1

Inventor:
Francis T. McDonough,
By Fisher, Towle, Clapp & Soans
Attys.

April 14, 1931.  F. T. McDONOUGH  1,800,651
DYNAMIC BALANCING MACHINE AND RECORDING AMPLIMETER THEREFOR
Filed Aug. 14, 1926  4 Sheets-Sheet 2
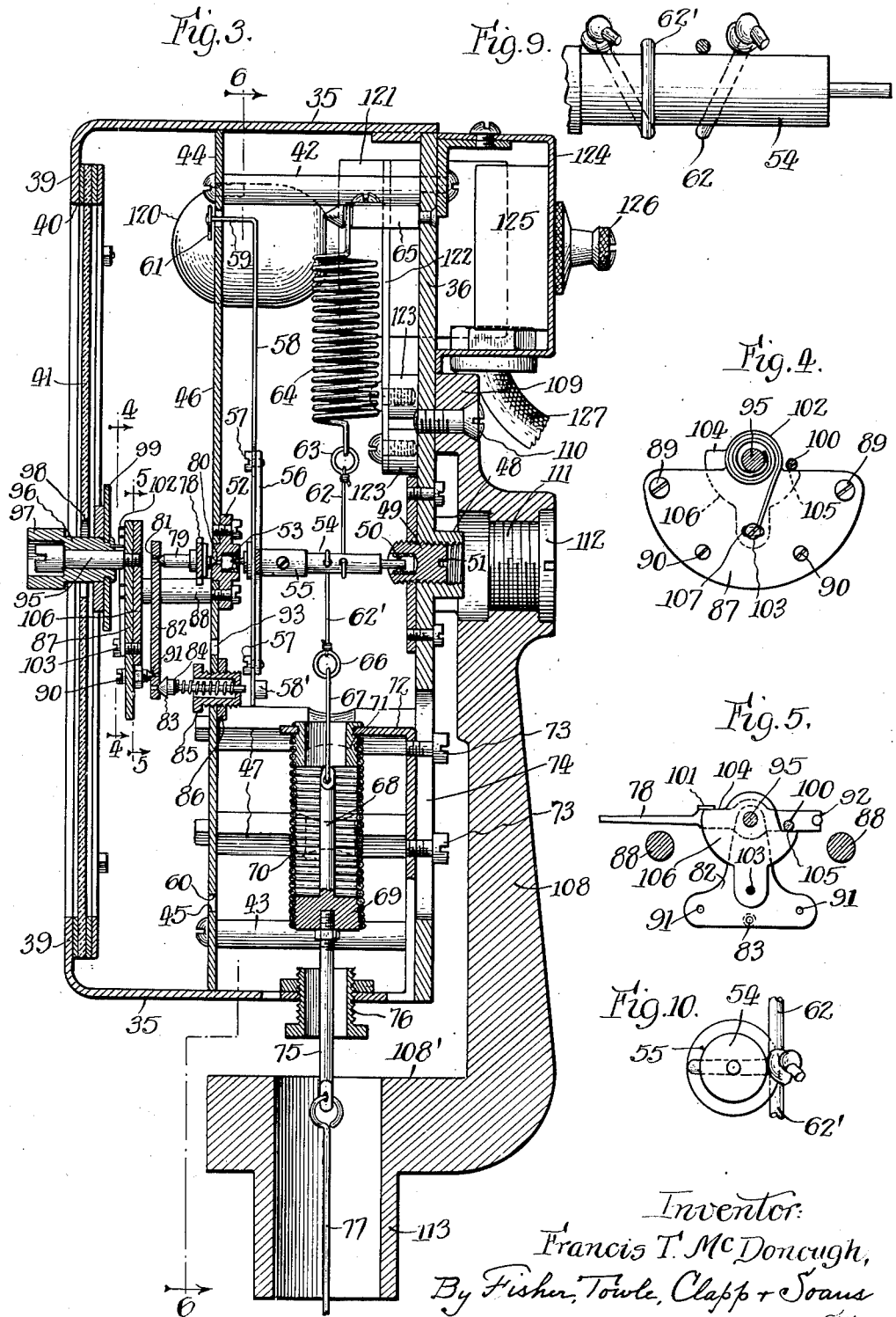
Inventor:
Francis T. McDonough,
By Fisher, Towle, Clapp + Soans
Attys

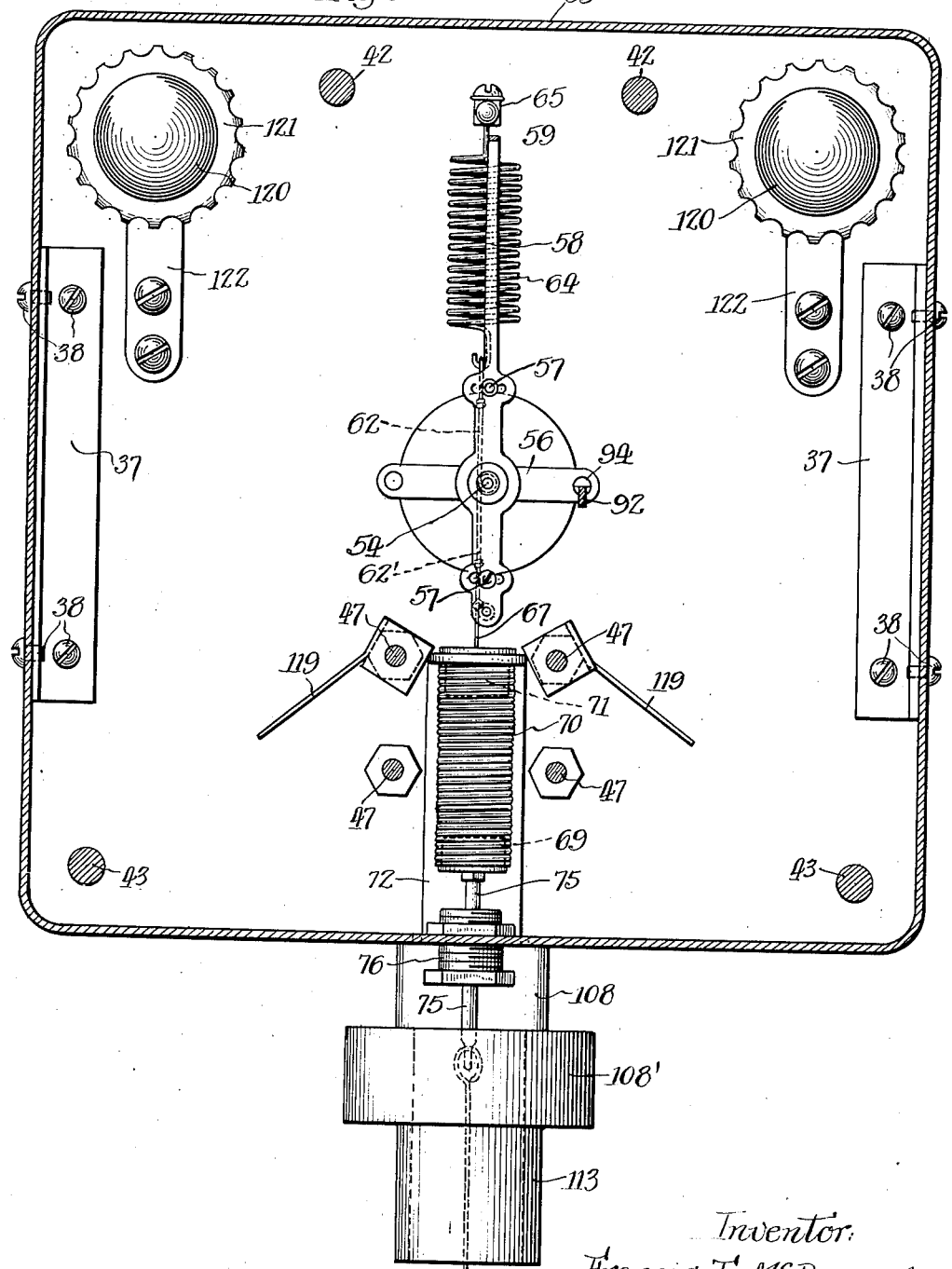

Inventor
Francis T. McDonough,
By Fisher, Towle, Clapp & Soans
Attys.

UNITED STATES PATENT OFFICE

FRANCIS T. McDONOUGH, OF MADISON, WISCONSIN, ASSIGNOR TO GISHOLT MACHINE COMPANY, OF MADISON, WISCONSIN, A CORPORATION OF WISCONSIN

DYNAMIC BALANCING MACHINE AND RECORDING AMPLIMETER THEREFOR

Application filed August 14, 1926. Serial No. 129,236.

This invention relates to a class of devices employed for determining the amount and location of unbalance in rotary machine parts and elements which theoretically are designed and intended to be in perfect balance on the axis of rotation so as to avoid the setting up of vibration effects when such parts and elements are rotated at considerable speed. A familiar instance is the crank shaft of a multiple cylinder gasoline motor as commonly used in automobiles; it being well known that the more perfectly the crank shaft is balanced on its axis of rotation, the less will be the vibration effects caused thereby under high rotary speed, and the less will be the wear on the shaft bearings.

More specifically, the present invention is based upon a type of balancing machine which employs a pivotally mounted frame as a support for the body to be tested, said frame carrying suitable bearings on which to mount the body for rotative movement, and being additionally supported at one end on the free end of a vibratory spring, usually of the cantilever type. The body to be tested is rotated, and if unbalance exists therein, its rotation causes the supporting frame to oscillate on its pivot. The pivoted frame has a so-called "natural period" of vibration; and when the body being tested reaches a speed of rotation such that its centrifugal unbalance coincides with the vibrations of the supporting frame under certain prescribed conditions it is said to be rotating at the "critical speed" or "speed of resonance," and at this speed under such conditions the maximum vibrations of the supporting frame occur. The amplitude then of these maximum vibrations is a basic factor in the subsequent mathematical determination of both the amount and the location of the unbalance in the test body.

A balancing apparatus of the type above referred to is disclosed in Letters Patent to Newkirk No. 1,557,268, October 13, 1925, and the specification of the said patent very fully sets forth the theory of operation and the means for determining the amount and location of the unbalance from the ascertained factor of the maximum vibrations of the pivoted supporting frame, occurring, as stated, at the "critical speed" of the test body.

Balancing machines of this type as heretofore used have been equipped with an indicator in the nature of a fixed scale and an oscillating pointer, the latter being so connected to the pivoted support carrying the test body as to vibrate over the scale synchronously and proportionately with the vibrations of the support; but in the performance of an actual test, the vibrations of the scale pointer are so rapid that it is a matter of difficulty for even the trained eye of a skilled operative to observe and note the point of maximum amplitude of vibration as shown by the indicator. With a view to eliminating this difficulty in the practical use of these machines, my present invention has had, as an important object thereof, the provision of a device which would make a record or fixed showing of the maximum amplitude of vibration of the scale pointer, so that the operative might be relieved of the usual strain of observing the same at the instant of its occurrence and making a note thereof for future use. In other words, one object of my present invention is to provide a balancing machine of the type referred to with a delicate, accurate and reliable recording amplitude meter of the scale and pointer type. Another object of the invention is to provide an accurate and efficient means for translating the oscillating movements of the pivoted work support into exactly proportional vibrating movements of the amplitude indicating pointer of the meter.

In order that my invention may be fully and clearly understood by persons skilled in the art, I have, in the accompanying drawings, illustrated one simple and practical embodiment thereof as applied to a dynamic balancing machine which, in practice, has been found to satisfactorily effectuate the stated purposes and objects of the invention, and referring thereto—

Fig. 3 is an enlarged vertical axial section, from front to rear, of the meter, its housing and supporting frame;

Fig. 4 is a sectional detail on the line 4—4 of Fig. 3;

Fig. 5 is a sectional detail on the line 5—5 of Fig. 3;

Fig. 6 is a vertical section in a plane at right angles to that of Fig. 3, taken on the line 6—6 of the latter figure;

Fig. 9 is a top plan detail of a portion of the arbor, showing the manner of attaching the cords thereto;

Fig. 10 is an end elevation of Fig. 9 viewed from the right.

Figure 1:
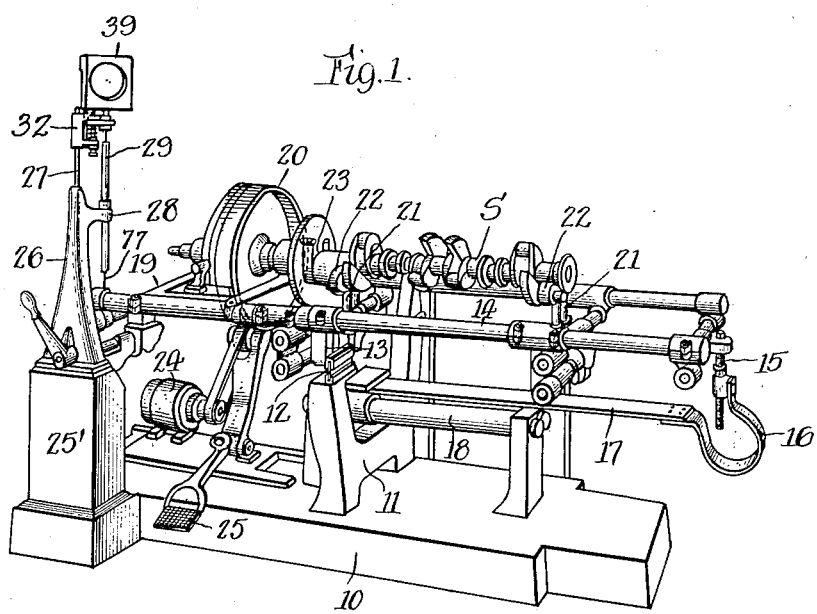
Fig. 1 is a perspective elevation of a dynamic balancing machine of the type above referred to, equipped with my improved recording amplimeter.
Figure 2:
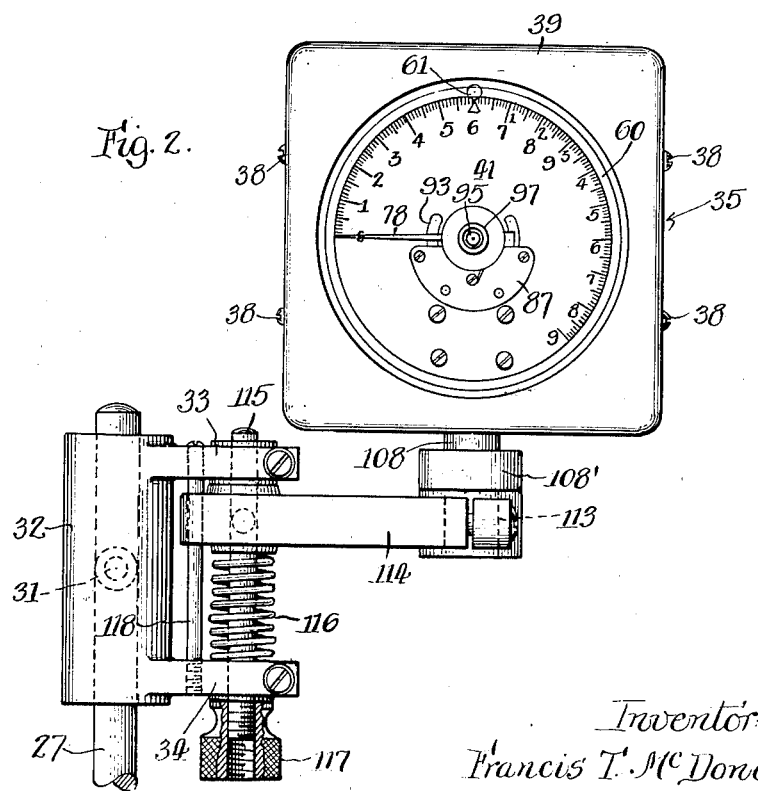
Fig. 2 is an enlarged front elevation of the amplimeter and its immediate support, the latter including means by which the meter may be set to indicate a neutral or rest position of the test body support when under load.

Referring first to Figs. 1 and 2 and briefly describing the principal elements of the balancing machine, 10 designates a heavy foundation or base plate on which is rigidly mounted a vertical yoke frame 11. On the upper end of the frame 11 are mounted a pair of plate spring pivots 12 to the upper edges of which are clamped supporting members 13 that carry a rectangular frame 14 designed to have a vertical swinging or vibrating movement on the pivots 12. One end of the frame 14 is adjustably connected by a screw 15 to a goose neck spring 16 carried on the free end of a cantilever spring 17 rigidly mounted at one end on a supporting frame 18 mounted on the foundation or base plate 10. Longitudinally adjustable at the left end of frame 14 is a headstock frame 19 on which is journaled a fly wheel 20.

At longitudinally spaced points on the frame 14 are standards 21 in which are journaled anti-friction rollers 22 that form supports for the test body, such for instance as the engine crank shaft indicated at S. The shaft of the fly wheel 20 carries a suitable chuck or adapter 23 that engages with one end of the test body to rotate the latter.

The revolving parts are set in motion by hand or power friction applied to the periphery of fly wheel 20. At 24 is indicated an electric motor mounted on the base 10, the armature of which is belted to a friction pulley engaged with the fly wheel 20 and so mounted that it may be engaged and disengaged with the pulley 20 through a pedal 25, whereby the pulley may be at first rotated to a speed beyond the critical speed, and may be then released from the driving agency and permitted to slowly run down through the critical speed without disturbing the natural vibration of the frame 14. It will be observed that in the machine above briefly described the anti-friction bearings 22 that support the test body are located on opposite sides of and at different distances from the vertical transverse plane of the spring pivots 12. This makes it possible, as is described in the Newkirk patent above identified, by reversing the position of the test body on its supports to cause two different planes of the body, substantially at right angles to its axis of rotation, to successively lie in the perpendicular axial plane of said spring pivots, whereby the amount of unbalance in both of said planes may be determined, in accordance with the known fact that complete dynamic balance, including static balance, can be accomplished by correction to the rotative body in two arbitrarily chosen planes at right angles to the axis of rotation.

At one corner of the base 10 is a pedestal 25' on which is rigidly mounted a vertical bracket 26 socketed to receive a post 27 and also formed with an arm 28 carrying a guard tube 29. Adjustable on the upper end of post 27 as by a set screw 31 (Fig. 2) is a meter supporting bracket comprising a sleeve 32 (Fig. 2) slidable on the post 27, and upper and lower split arms 33 and 34. This bracket constitutes an adjustable support or carrier for the vibration amplitude meter next to be described.

Referring now to Figs. 3 to 8 inclusive, the casing or housing of the meter as herein shown comprises a rectangular rim wall 35, a back plate 36 set into said rim wall and attached thereto by angle brackets 37 (Fig. 6) and fastening screws 38, and a front wall 39 conveniently formed integral with the rim wall 35 and having a large central opening 40 covered by a glass plate 41. Attached to the back plate 36 by a pair of upper horizontal posts 42 and a pair of lower horizontal posts 43 is a dial frame plate 44 fitting the rim wall 35 interiorly and having a central circular opening 45 in rear of and commensurate with the front opening 40. Within this opening 45 and occupying the plane of the frame plate 44 is the dial disc 46 of the meter mounted and supported at its lower portion on and by four horizontal posts 47 connecting the same to the back plate 36.

On the back plate 36 is a central tapped boss 48 in which is mounted a threaded plug 49 forming one bearing member for the main arbor of the meter; the inner end of the plug 49 being chambered and preferably fitted with a jewel bearing 50, and its rear end having a kerf 51 for convenient adjustment by a screw-driver. Attached to the dial disc 46 is a bearing block 52 suitably chambered to receive a jewel bearing 53. In the jewel bearings 50 and 53 is mounted the main central arbor 54, keyed to which is the sleeve or hub 55 of a four-arm spider 56 (see Fig. 6). Fitted onto the arbor 54 and adjustably attached to oppositely extending arms of the spider 56 by screws 57 is the indicating pointer 58, the upper end portion of which is rectangularly bent, as shown at 59 and extends through the annular slot 60 (Fig. 7) formed between the edge of the opening 45 and the periphery of the dial plate 46; the forwardly bent end 59 of the indicating pointer preferably carrying a pointer tip 61 overlying a graduated scale 46' on the scale disc. On the heel end of the pointer 58 is a small counterweight 58' (Fig. 3) designed to secure a perfect balance of the pointer on its arbor.

Attached to the arbor 54, preferably in the manner clearly indicated in Figs. 3, 9 and 10, are two cords 62 and 62', spaced some distance apart on the arbor, that are maintained under constant tension. The upper end of the cord 62 is connected through a ring 63, to the lower end of a pull spring 64, this latter being anchored at its upper end to a post 65 on the back plate 36. The lower end of cord 62' is connected through a ring 66 and cord 67 to a rod 68, this latter having at its lower end a head 69 screwed into the lower end of a coil tension spring 70. The upper end of spring 70 is screwed onto a hollow plug 71 secured in the horizontal limb of an angle bracket 72, which latter is attached to the back plate 36 with capacity of vertical adjustment by a pair of screws 73 extending through a vertical slot 74 in the back plate. Attached to and depending from the head 69 is a rod 75 forming, in effect, an extension of the rod 68, and extending through a bushing 76 mounted in the bottom of the rim wall 35 and forming an adjustable stop to limit the oscillation of the arbor and the swing of the pointer in one direction, as hereinafter explained. To the lower end of rod 75 is attached a tension member 77 which may be a fine wire or rod or equivalent device combining a high degree of tensional strength with light weight, this wire extending down through the guide tube 29 and attached to the vibrating frame 14 of the balancing machine, as shown in Fig. 1. Through the parts last described the vertical vibrating movements of the pivoted frame 14 are translated into oscillating movements of the arbor 54 and swinging movements of the indicating pointer 58.

Overlying the front of the dial disc 46 is a recording pointer 78, the purpose of which is to record the maximum oscillations of the frame 14 which, as stated, occur at the so-called "critical speed". This recording pointer 78 is manually set to its zero position indicated in Figs. 2 and 7, and is moved therefrom upwardly of the scale by the spider 56 of the indicating pointer, being so mounted as to remain fixed at the point of maximum movement which corresponds to the maximum oscillation of the indicating pointer. Describing the means for mounting and actuating the recording pointer 78, 79 designates a short arbor disposed coaxially with the indicating arbor 54, on which the recording pointer 78 is mounted. One pointed end of the arbor 79 has a bearing in a correspondingly shaped seat 80 in the front face of the bearing block 52. The other pointed end of the arbor 79 engages a similar seat 81 in the upper end of a friction bearing plate 82. Said plate 82, as shown in Fig. 5, is formed with a widened base the central portion of which is engaged by the conical head 83 of a spring-pressed plunger 84 that, in turn, is slidably mounted in and normally pressed forwardly from a screw-threaded plunger housing 85 mounted and adjustable in the dial disc 46 and secured by a lock nut 86. 87 (Fig. 4) designates a substantially semi-circular outer mounting plate that is rigidly attached to the dial disc 46 by a pair of posts 88 and screws 89. Mounted in the lower portion of the mounting plate 87 are a pair of fulcrum screws 90 having pointed inner ends that engage correspondingly shaped seats 91 (Fig. 5) in the outer face of the friction bearing plate 82. The thrust of the spring-pressed plunger 84 on the lower end of the bearing plate 82 tends to rock said plate on its fulcrum points 90, thereby causing the upper end of the plate 82 to press lightly against the arbor 79, creating sufficient friction in the bearings of the latter to hold the said arbor and its recording pointer 78 at any set position.

Figure 7:
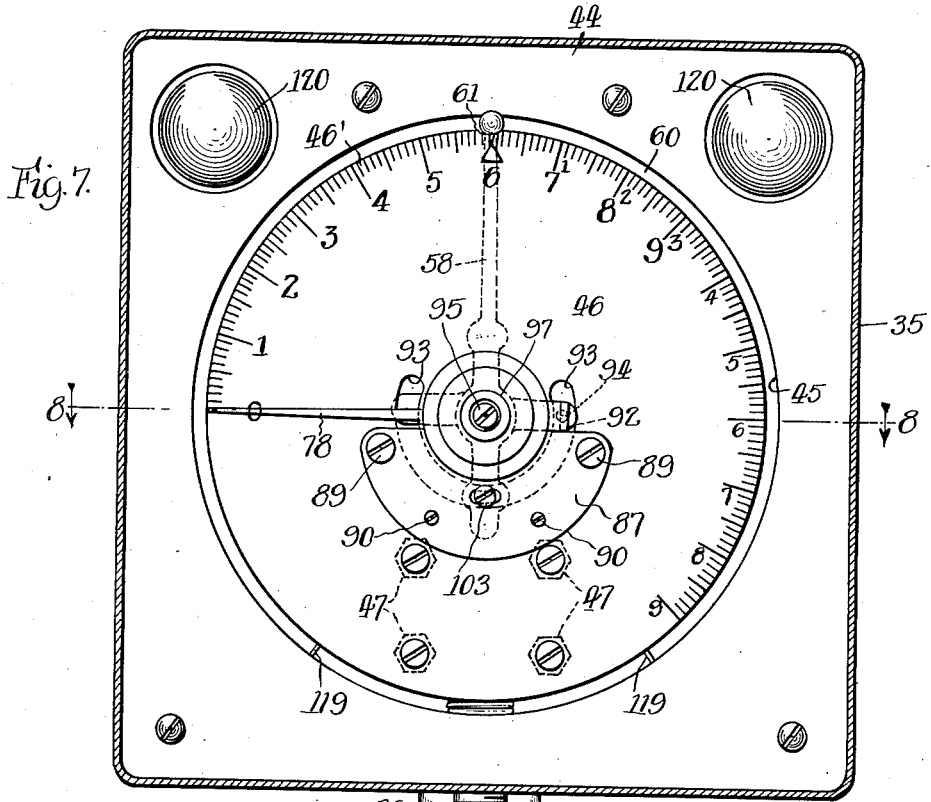
Fig. 7 is a front elevation of the meter box or casing, with the front wall thereof removed.
Figure 8:
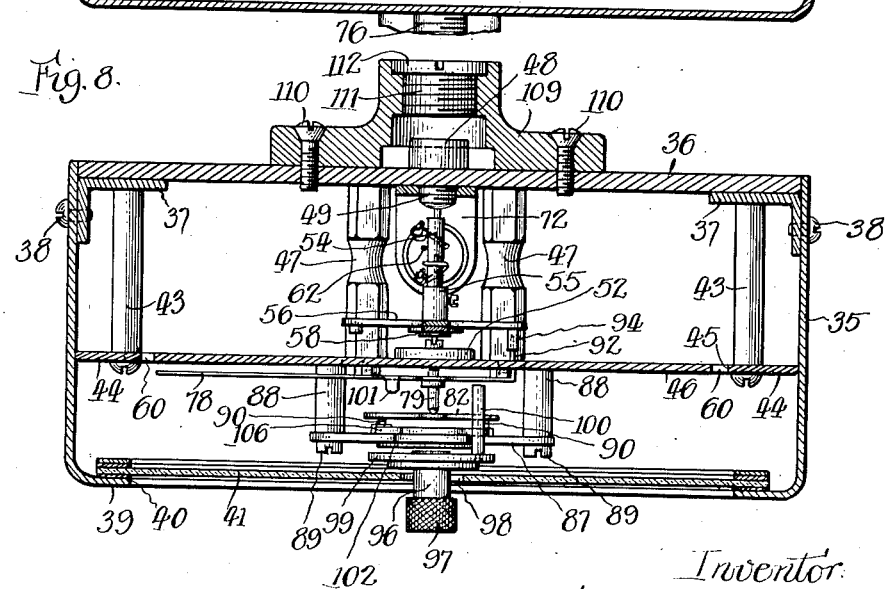
Fig. 8 is a horizontal section on the line 8—8 of Fig. 7.

Referring to Figs. 7 and 8, the recording pointer 78 is formed with an inwardly bent tail piece 92 that extends through an arcuate slot 93 in the dial disc 46 concentric with the axis of the latter; and this tail piece 92 lies in the path of travel of a striker lug 94 fast on one of the arms of the spider 56 which lies at a right angle to the indicator pointer 58. Consequently, when the indicator pointer swings clockwise, viewing Figs. 2 and 7, to a point where the striker lug 94 hits the tail piece 92 of the recording pointer 78, the latter is carried along in the same direction with, and to the same extent as, the indicating pointer. It will be observed that in the arrangement shown the scale disc is equipped with two fixed scales of equal lengths, one located 90° ahead of the other on the face of the disc, and the zero points of the two scales are, therefore, 90° apart, the zero point of the indicating pointer being at the top and the zero point of the recording pointer being 90° to the left. Hence, movement of the indicator pointer in a counter-clockwise direction is without effect on the recording pointer, but movement of the indicator pointer in a clockwise direction from its zero point is accompanied by an equal movement in the same direction of the recording pointer, which latter remains in its moved position during the return or counter-clockwise movement of the indicating pointer.

Where the dial disc 46 is exposed, the recording pointer 78 may be reset to zero or starting position by hand; but where the dial disc is protected as by the glass cover 41, mechanical means must be provided for resetting the recording pointer; and a simple device for that purpose comprises the following parts. Secured in and projecting forwardly of the outer mounting plate 87 is a fixed stud 95, rotatable on which is a sleeve 96 terminating in a turning knob 97; said stud and sleeve extending through a central hole 98 in the glass cover disc 41. Fast on the inner end of the sleeve 96 is a disc 99, on the inner face of which (Fig. 8) is a pin 100. In the path of the free end of the pin 100 is a lateral lug 101 on the recording pointer 78. Counter-clockwise turning of the disc 99 causes the pin 100 to strike the lug 101 and swing the recording pointer 78 back to its zero position shown in Figs. 2 and 7, if it is not already in that position. The pointer reset pin 100 is constantly urged to a position wherein it is effective to reset the recording pointer from its extreme limit of swing by a helical spring 102 (Figs. 3 and 4) anchored at one end to the sleeve 96 and at its other end to an anchor screw 103 in the outer mounting plate 87. The movements of the reset pin 100 are limited in both directions by shoulders 104 and 105 (Fig. 5) formed on a reset stop plate 106 that is mounted on the inner face of the outer bearing plate 87 by means of the bearing stud 95 and the spring anchor screw 103. As shown in Fig. 4, the anchor screw 103 may extend through a transverse slot 107 in the bearing plate 87, thereby providing for nice adjustment of the stop shoulders 104 and 105 of the stop plate to exact correspondence with the dial scale, thus rendering unnecessary delicate manipulation of the knob 97 when returning the recording pointer to zero.

Describing next the means for mounting and supporting the meter casing, 108 designates a vertical bracket arm (Fig. 3) formed on its upper end with the integral attachment plate 109 secured to the back wall 36 as by screws 110. This attachment plate 109 is formed with a central tapped opening 111 normally closed by a plug screw 112; said opening lying directly behind the arbor bearing plug 49, so that, by removing the plug screw 112, access is readily had by a screwdriver to the bearing plug for adjusting the latter. The lower end of the bracket arm 108 is formed with an offset extension 108' formed with a depending tenon 113, the extension 108' and tenon 113 being made tubular for the passage of the links 75 and 77 of the tension connection from the meter to the pivoted machine frame 14. The tenon 113 has a swivel bearing in the free end of the horizontal bracket arm 114 (Fig. 2); the inner end of said bracket arm being keyed to a vertical rod 115 that is slidably mounted in suitable bearings in the bracket arms 33 and 34. The arm 114 is pressed upwardly against the bearing of the upper bracket arm 33 by a stiff compression spring 116 encircling the rod 115 and confined between the bracket arm 114 and the lower bracket arm 34. The lower end of the rod 115 is threaded and receives an adjusting thumb nut 117 bearing against the lower bracket arm 34. By turning the nut 117 the meter supporting arm 114 may be raised or lowered relatively to its main carrying bracket 32. The arm 116 is held against lateral swinging movement through sliding engagement of its grooved inner end with a guide rod 118 extending between the arms 33 and 34 parallel with the adjusting rod 115.

The last-described meter supporting means facilitates the setting of the indicator pointer to its zero position shown at the top of the scale when the balancing machine has been loaded with a test body and is ready for operation. Since test bodies of varying weights will produce slightly different rest positions of the pivoted frame, which would, of course, cause different starting positions of the indicating pointer on the scale, it is essential, before beginning rotation of the test body, to set the indicating pointer to exact zero position. With test bodies differing but slightly in their static effects on the pivoted frame 14, this may be done by mere manipulation of the adjusting nut 117. If, when the machine is loaded, the indicator pointer lies to the right of its zero position shown in Fig. 7, it may be quickly brought to zero position by slightly elevating the arm 114 and the meter carried thereby. If, on the other hand, when the machine is loaded, the indicator pointer lies to the left of its zero position, viewing Fig. 7, then the nut 117 will be so manipulated as to effect a lowering of the arm 114 and the meter until the indicator pointer registers zero. In either case, the indicator pointer having been thus adjusted to zero or starting position, as the frame 14 oscillates under the rotation of the test body thereon, the indicator pointer 58 fluctuates on both sides of its zero position. The clockwise movements of the pointer cause corresponding advance movements of the recording pointer 78, the latter being gradually advanced until the "critical speed" is reached, which causes the maximum oscillation of the indicator pointer, and the position on the scale to which the recording pointer is moved thereby designates and makes a record of the maximum amplitude of the vibrations. This having been noted, the machine is unloaded, a new test body mounted thereon, the indicator pointer readjusted to zero position, if necessary, and the next test performed in the manner described.

The swinging movement of the indicator pointer 58 in a counter-clockwise direction is limited at a point somewhat beyond the zero position of the recording pointer by contact of the head 69 in the lower end of the spring 70 with the upper end of the adjustable stop bushing 76; while the swinging movement of the same pointer in a clockwise direction is similarly limited at a point somewhat beyond the terminal scale divisions through the closing of the coils of spring 70 on each other. Both of these stop positions may be varied by vertical adjustment of the bracket 72 on the back plate. An additional safeguard to prevent possible accidental bending of the indicator pointer through sudden overthrow resides in a pair of suitably located bumper springs 119, best shown in Fig. 6, mounted on the dial plate supporting posts 47; bumper springs of this character being in common use on volt meters and ammeters.

In order to facilitate reading of the scale and avoid the necessity of locating the instrument in favorable relation to external light, I preferably equip the instrument itself with a pair of small electric lamps 120, the bulbs of which are mounted in sockets 121 and project through openings in the dial filler plate 44 so as to transmit a suffused light to the face of the dial. The lamp sockets 121 are herein shown as mounted in openings in the back plate 36 and held rigidly by ring brackets 122 attached to posts 123 on the inner side of the back plate 36. Attached to the upper portion of the back plate 36 is a switch box 124 into which the circuit wires for the lamps extend, and in which is mounted a suitable switch 125 controlled by a knob 126; the lead cord carrying the circuit wires being shown at 127 entering the lower wall of the switch box 124. This illumination of the dial of the instrument by means of lamps entirely enclosed in the case constitutes a valuable practical feature, since it makes the reading of the dial always plain, regardless of general lighting conditions.

In an instrument of the character herein described a prime necessity to the attainment of accuracy is the reduction to the lowest possible point of all factors and influences, such as friction and wear, tending to retard or otherwise affect the sensitiveness and responsiveness of the moving parts to the small impulses transmitted thereto and recorded thereby. The attainment of this object has been the primary consideration in the design of the present meter. The recording pointer is moved forward by impulses given it by the oscillating indicator pointer. The impulses given to the recording pointer by the oscillating indicator pointer arm are of such a nature with this device as to absorb but little of the energy of the oscillating frame 14. These impulses, especially when near the speed of resonance, have but a small increment from cycle to cycle of oscillation, and the contact between the arms being about at the end of travel and reversal where the speed of the oscillating arm is lowest, the reaction between the arms is minimized. Moreover, the oscillating arm strikes the recording arm at the end of one stroke only, being free at the other end of the cycle. The recording arm is restrained from moving too far, and retained in each successive new position, by the friction on the bearings of its arbor or shaft. This friction must not be too great, or the vibration of the oscillating frame of the machine will be damped; while on the other hand the friction must not be too slight, or the pointer will overrun. Therefore, proper functioning of the recording and maximum indicating pointer depends on a delicate adjustment of the restraining friction of its bearings, and this adjustment for friction must not only be delicately adjustable, but adjustment must also be stable so that it will not vary the slightest amount under wear on its bearings, or vibration, or changes in temperature; and at the same time the arbor must be held in rigid alignment. I have found that these ends may be satisfactorily attained by making the arbor 79 with hardened and polished conical ends gripped under light tension between the bearings of soft metal. The described means for attaining this tension on the bearings, comprising a pivoted bearing plate resting on two widely separated fulcrum points makes a very rigid support for the end of the arbor, the spring pressing on the plate slightly below the line of the fulcrum points makes the pressure on the end of the shaft very light and yet positive. This arrangement also makes a bearing for the end of the arbor that is without play sidewise or endwise, will not shift under jarring or rough handling of the instrument, automatically takes up wear in the bearing, is delicately adjustable, and will retain its adjustment indefinitely.

Other features contributing to the sensitiveness and practical utility of the instrument are the use of jewel bearings for the arbor of the indicator pointer, the described spring arrangement through which the cords transmitting the vibrations to the indicator arbor are continuously held under tension, the described means for transmitting the forward impulses of the indicator pointer to the recording pointer, the manually operated means for accurately resetting the recording pointer to its zero position, and the described means, based on an up and down bodily adjustment of the instrument relatively to its support, for setting the indicator pointer to its zero or starting position in accordance with variations in the neutral or rest position of the pivoted frame of the machine. The use of two cords, such as 62 and 62', separately attached to the arbor and spaced apart has the advantages over a single cord wrapped around the arbor,—that it prevents friction and wear through the cord rubbing on itself, and also prevents slip of the cord on the arbor.

Specific features of the amplitude recording meter herein shown and described are not claimed herein, but form the subject-matter of a divisional application, Serial No. 225,132, filed October 10, 1927.

In the foregoing I have set forth one practical physical embodiment of the invention which in practice has been found to satisfactorily effectuate the stated purposes and objects thereof. Manifestly, however, many variations and changes in the details of structure and arrangement from those herein shown and described might be resorted to without involving any departure from the substance of the invention or sacrificing any of the benefits and advantages thereof. Hence, I do not limit the invention to the particular embodiment herein disclosed for purposes of illustration, but reserve all such variations, modifications and mechanical equivalents as fall within the spirit and purview of the claims.

I claim—

1. In a balancing machine, the combination with a vibratory support for the body to be tested, of an indicator arbor, a cord fastened to said arbor and connected to said support, a second cord attached to said arbor, means acting through said second cord to maintain both cords continuously in tension during vibrations of said support, a scale, and an indicating pointer on said arbor co-operating with said scale.

2. In a balancing machine, the combination with a vibratory support for the body to be tested, of an indicator arbor, a cord fastened to said arbor and connected to said support, a second cord attached to said arbor, means acting through said second cord to maintain both cords continuously in tension during vibrations of said support, a scale, an indicating pointer on said arbor co-operating with said scale, a recording pointer actuated from said arbor, and means for maintaining said recording pointer at a point corresponding with the maximum swing of said indicating pointer.

3. In an instrument for measuring and recording the amplitude of oscillations of a vibrating member, the combination with a vibrating member of a dial, an arbor, means for effecting synchronous and proportional oscillating movements of said arbor from said vibrating member, a second arbor, friction bearings in which said second arbor is mounted, a recording pointer fast on said second arbor, and means actuated by said first-named arbor for advancing said pointer over said dial.

4. In a balancing machine, the combination with a pivoted support for the body to be tested, of an amplitude meter having an arbor, an actuating cord fastened to said arbor and connected to said support for turning said arbor in one direction, a second cord attached to said arbor, a pull spring connected to said second cord for turning said arbor in the other direction, and stops for limiting the turning movement of said arbor in both directions.

5. In a balancing machine, the combination with a pivoted support for the body to be tested, of an amplitude meter having an arbor, arbor-actuating means attached to said arbor and connected at one end to said support, a pull spring connected to the other end of said means, a second pull spring connected to said means between said arbor and said support, and stops limiting the expanding and contracting movements of said second pull spring.

6. In a balancing machine, the combination with a pivoted support for the body to be tested, of an amplitude meter having an arbor, arbor-actuating means attached to said arbor and connected at one end to said support, a pull spring connected to the other end of said means, a second pull spring connected to said means between said arbor and said support, an anchor for said second pull spring adjustable toward and from said arbor, and an adjustable stop member limiting the expanding movement of said second pull spring.

FRANCIS T. McDONOUGH.